United States Patent [19]
Wohl et al.

[11] Patent Number: 6,112,891
[45] Date of Patent: Sep. 5, 2000

[54] OBJECT AND AUDIO MEDIUM ARRANGEMENT AND FORMATION PROCESS

[75] Inventors: Michael Wohl, Silver Spring; Stephen Schulhoff, Baltimore, both of Md.

[73] Assignee: Prism Crafts, Inc., Laurel, Md.

[21] Appl. No.: 09/123,895

[22] Filed: Jul. 28, 1998

[51] Int. Cl.$^7$ .................................................. B65D 69/00
[52] U.S. Cl. ........................ 206/223; 206/232; 206/310; 206/308.1; 431/253
[58] Field of Search .................................... 206/223, 232, 206/308.1, 310; 431/253, 288

[56] References Cited

U.S. PATENT DOCUMENTS

| | | | |
|---|---|---|---|
| 5,076,433 | 12/1991 | Howes | 206/232 |
| 5,542,532 | 8/1996 | Mitchell | 206/308.1 |
| 5,748,608 | 5/1998 | Spector | 206/308.1 |
| 5,893,453 | 4/1999 | Ishikawa | 206/232 |

*Primary Examiner*—David T. Fidei
*Attorney, Agent, or Firm*—McGlew and Tuttle, PC

[57] ABSTRACT

An audio medium and candle arrangement includes a candle having an outer contour and a first end and a second end. An audio medium is provided having an outer contour which generally corresponds to the outer contour of the candle. The audio medium is positioned adjacent to the candle. The candle enclosure maintains a position of the audio medium relative to the candle. The enclosure may be a tin enclosure with a bottom tin (canister) portion having a candle provided therein and a tin lid for closure of the tin. The tin lid is provided with an inner diameter which is slightly larger than the outer diameter of a compact disc. The inner diameter of the tin lid is provided in a normal way for mating with the tin bottom to close the tin. A compact disc is provided on a compact disc backer or audio medium support, such as a support made of cardboard. Preferably the cardboard backer has a CD center support element for positioning and supporting the CD relative to the backer. The backer and the CD are preferably shrink wrapped together to form a shrink wrap subassembly. The shrink wrap subassembly is positioned in the underside of the tin lid. By selecting a diameter of the backer which is just slightly larger than the inside diameter of the tin lid, it is possible to firmly position the CD allowing the lid to be closed while retaining the shrink wrap subassembly in a position relative to the tin lid.

17 Claims, 5 Drawing Sheets

OBJECT AND AUDIO MEDIUM ARRANGEMENT AND FORMATION PROCESS

FIELD AND BACKGROUND OF THE INVENTION

The invention relates generally to objects such as candles, scented soaps, candy and other small items and audio media and more particularly to the packaging of an object along with an audio medium.

BACKGROUND OF THE INVENTION

Candles of various types are available including candles of various different shapes. The use of scents in combination with candles is also well known. Scented candles have become increasingly popular, particularly for aroma-therapy uses. Other scented items such as scented soaps and pot pori are also useful for aroma-therapy uses.

Soothing music has also been used for some time for affecting the mood of a listener. New age music as well as various other types of music are also used for relaxation. Aroma-therapy in combination with music therapy provides an effective combination of two effective relaxing agents.

SUMMARY AND OBJECTS OF THE INVENTION

It is an object of the invention to provide a candle and audio medium arrangement which are complimentary both with regard to the packaging arrangement for sale and also the arrangement for use.

It is another object of the invention to provide a object container and audio medium arrangement which are complimentary both with regard to the packaging arrangement for sale and also the arrangement for use.

It is still another object of the invention to provide a packaging arrangement of a candle and a compact disc which protects both the candle and the compact disc during handling and during the purchase procedure and preferably also provides a convenient container for keeping the candle and/or compact disc.

It is a further object of the invention to provide a packaging arrangement of an object container and a compact disc in which the compact disc is protected both during handling and during the purchase procedure and wherein the container also preferably also provides a convenient means for keeping the candle and/or compact disc.

According to the invention, a candle and audio medium arrangement is provided wherein the candle is positioned next to the audio medium and each of the candle and the audio medium share generally a common contour.

The audio medium (audio/video media may also be used) may be any of a variety of known and convenient devices such as a compact disc, a minidisc, DVD, CD-ROM, standard audio cassette, minicassette, microcassette, etc. The candle preferably shares the shape of the general outer contour of the audio media. Preferably the candle is slightly larger as to the outer contour dimension as compared to the audio medium. The audio medium is placed on an end of the candle and the combination may be wrapped or enclosed.

Various different audio medium have various different shapes. The compact disc has a circular shape thereby lending itself particular to a circularly cylindrical candle. The circularly cylindrical candle has either the same or a slightly larger diameter than the compact disc. A standard audio cassette has a generally rectangular profile. This lends itself to use with a generally rectangularly cylindrical candle, preferably a rectangular candle with outer contour dimensions which are slightly larger or about the same as the standard audio tape. Most of the other audio mediums present generally similar circular or rectangular shapes (with different dimensions). However, according to the invention, a die-cut (non-circular) compact disc can be provided such as the compact discs offered by SHAPE CD of New York, N.Y. Compact discs with for example a Christmas tree shape can be provided with a Christmas tree shaped candle. The Christmas tree shaped disc is disposed adjacent to an end of the Christmas tree shaped candle. Other matching contour shapes may also be provided.

Accordingly to an especially advantageous embodiment of the invention, a tin enclosure is used with a bottom tin (canister) portion having a candle provided therein and a tin lid for closure of the tin. The tin lid is provided with an inner diameter which is slightly larger than the outer diameter of a compact disc. The inner diameter of the tin lid is provided in a normal way for mating with the tin bottom to close the tin and for example provide a final assembly (which may be wrapped with plastic or which may be sold with no wrapping). A compact disc is provided on a compact disc backer or audio medium support, such as a support made of cardboard. Preferably the cardboard backer has a CD center support element for positioning and supporting the CD relative to the backer. The backer and the CD are preferably shrink wrapped together to form a shrink wrap subassembly. The shrink wrap subassembly is positioned in the underside of the tin lid. By selecting a diameter of the backer which is just slightly larger than the inside diameter of the tin lid, it is possible to firmly position the CD allowing the lid to be closed while retaining the shrink wrap subassembly (including CD and backer) in a position relative to the tin lid.

According to another embodiment of the invention, the tin canister is made with a lower lip defining a recessed bottom. The candle and tin canister may be provided without a tin lid and sold without such. However, the shrink wrap subassembly including CD and backer may be positioned against the recessed bottom within the lip of the tin canister. Again by selecting an outer diameter of the backer to be just slightly greater than the inner diameter of the tin lip, it is possible to have the shrink wrapped subassembly maintained in a position relative to the tin. The final assembly may be sold as is (although it is of course possible to remove the CD from the candle) or the entire assembly may be wrapped such as with shrink wrap or the like.

Arrangements for cassettes, minicassettes, minidiscs, etc. are also possible, however, the shape of the tin canister, the tin lid (if used) and the candle are all varied based on the shape of the audio medium used.

According to another advantageous embodiment of the invention, the audio medium is positioned by itself or with a backer directly on one end face of the candle. Again the candle has an outer contour dimension which is similar (preferably slightly larger) than the audio medium. This entire final assembly may be wrapped such as with shrink wrap material. This arrangement has the advantage of the color of the candle and the art work on the audio medium (such as art work on the compact disc) being visible. However, both the candle and the compact disc are subject to damage. For this reason, the final assembly can be combined with an outer protective enclosure such as an outer protective enclosure used for standard candles (boxes, etc.).

According to another aspect of the invention, a process is provided including providing an audio medium having a contour shape and providing a rigid or semi rigid container having a peripheral shape. The audio medium is positioned on a backer to form a sub assembly. The backer has an outer peripheral shape which is somewhat larger than an outer peripheral shape of the audio medium. The container has an enclosed surface peripheral shape which is somewhat smaller than the backer peripheral shape. The sub assembly is disposed in the enclosed surface peripheral shape of the container such that an edge of the backer which is radially outwardly of the audio medium is deformed and retains the sub assembly with respect to the container by establishing a frictional connection.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
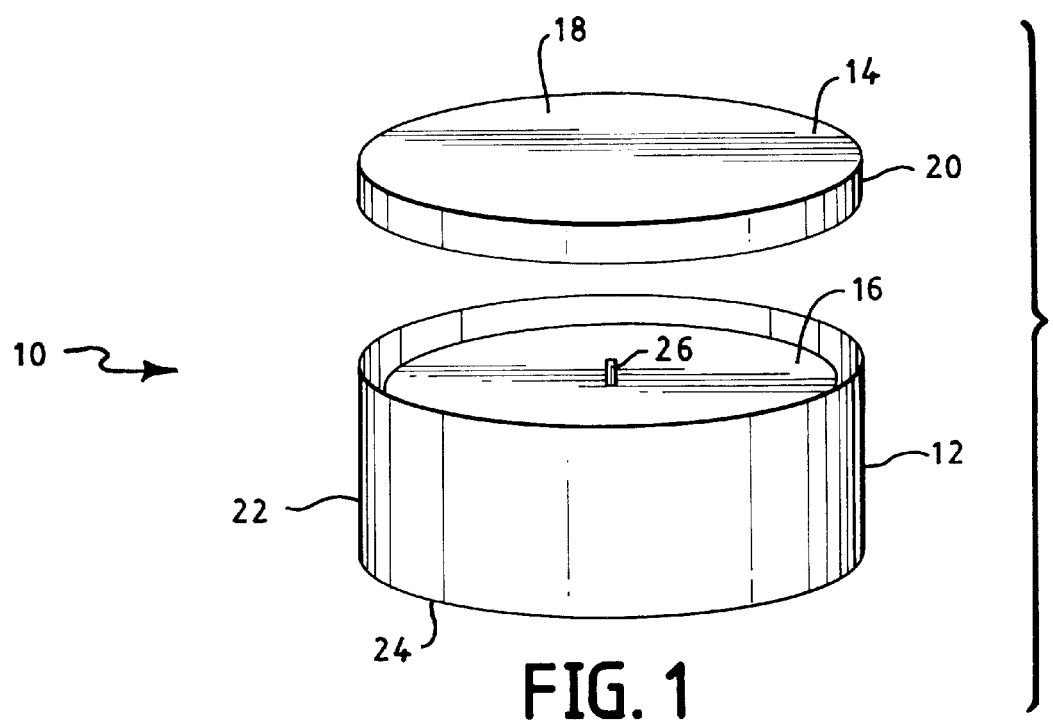
FIG. 1 is a perspective exploded view of a final assembly according to an embodiment of the invention.
Figure 2:
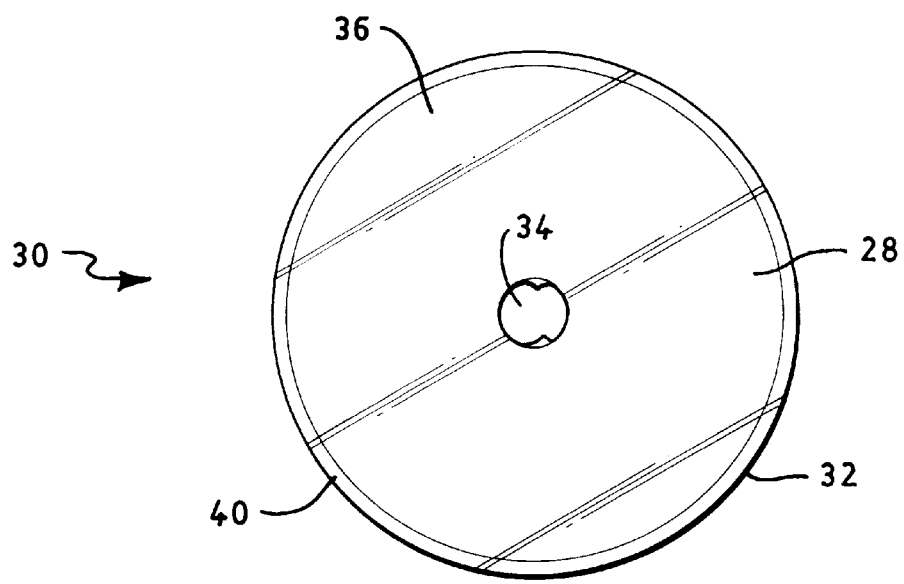
FIG. 2 is a top view of a shrink wrap subassembly including CD audio medium and backer according to the embodiment of FIG. 1.

Referring to the drawings in particular, FIG. 1 shows a enclosure assembly generally designated 10. In the embodiment of FIG. 1 the enclosure assembly 10 includes a tin canister 12 and a tin lid 14. A candle 16 or other object (scented soap, candies, pot pori etc) is disposed in the tin 12. The candle 16 (or candles or a mixture of objects) may be loosely placed in the tin, e.g. with a diameter smaller than the interior diameter of tin canister 12. The candle 16 may also be formed within the tin canister 12. The lid 14 has a top 18 with a top outer surface and a top inner surface. The tin lid 14 also has a side 20 with a side outer surface and a side inner surface. In a similar manner the tin canister 12 has a side 22 with an outer surface and an inner surface (for example in contact with the candle 16 wherein the candle is formed within the tin canister 12) and a tin bottom 24. The candle of course has one or more wick 26.

A compact disc 28 is provided which has an outer contour dimension which is its diameter. The diameter is somewhat smaller than the inner diameter formed by the inner surface of side 20 of the tin lid 14.

According to the embodiment of FIG. 1, the compact disc 28 is provided in a shrink wrap subassembly 30. The shrink wrap subassembly 30 includes a medium support 32 which is preferably a cardboard paper type backer. The backer 32 preferably also includes a CD center support element 34.

The backer may have a circular outer contour or some other shape. The backer 32 has at least one dimension (such as the diameter of backer 32) which is slightly larger than the inner diameter defined by the inner surface of sides 20 of tin lid 14. The compact disc 28 and backer 32 are placed together with the CD center support element 34 passing through the central hole of the compact disc 28. The compact disc 28 and the backer 32 are then shrink wrapped in plastic material 36 to form the shrink wrap subassembly 30.

As the CD center support element 34 positions the compact disc 28 relative to the backer 32, there is a peripheral region 40 formed between the outer edge of backer 32 and compact disc 28. If the backer 32 is not circularly shaped, the backer 32 should at least have two portions, each of which provide a peripheral region 40.

Figure 4:
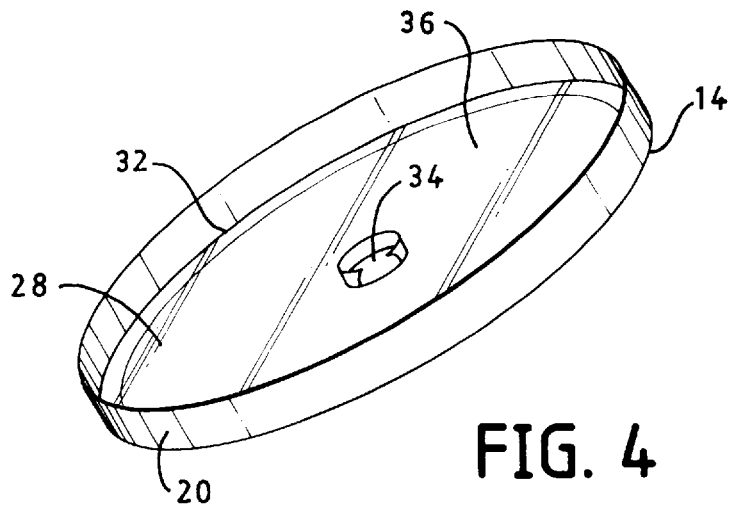
FIG. 4 is a perspective view showing a tin lid with positioned shrink wrap subassembly according to the embodiment of FIG. 1.
Figure 3:
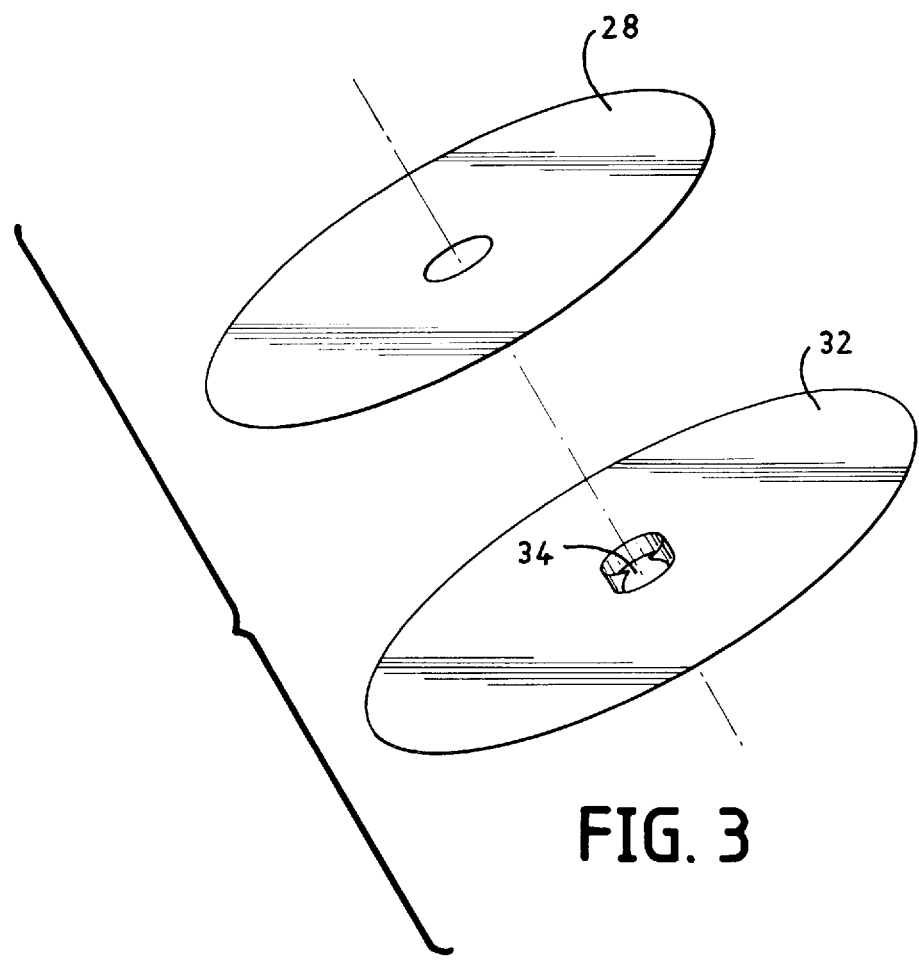
FIG. 3 is an exploded view showing the positioning of the CD audio medium on the medium support according to the embodiment of FIG. 1.

As shown in FIG. 4, the shrink wrap subassembly 30 is disposed within the interior of the tin lid 14. Because the outer contour of the medium support 32 has a greater dimension than the dimension defined by the inner surface of wall 20, the shrink wrap subassembly 30 is wedged into the interior of the tin lid 14. This provides a temporary holding of the compact disc, particularly the entire shrink wrap subassembly 30 in the tin lid 14. This wedge fitting maintains the position of the compact disc (audio medium) 28 relative to the candle 16 when the canister is closed to form the final assembly 10. The peripheral region 40 allows the wedging effect but also prevents any significant forces from being applied between the compact disc 28 and the tin lid 14.

Figure 5:
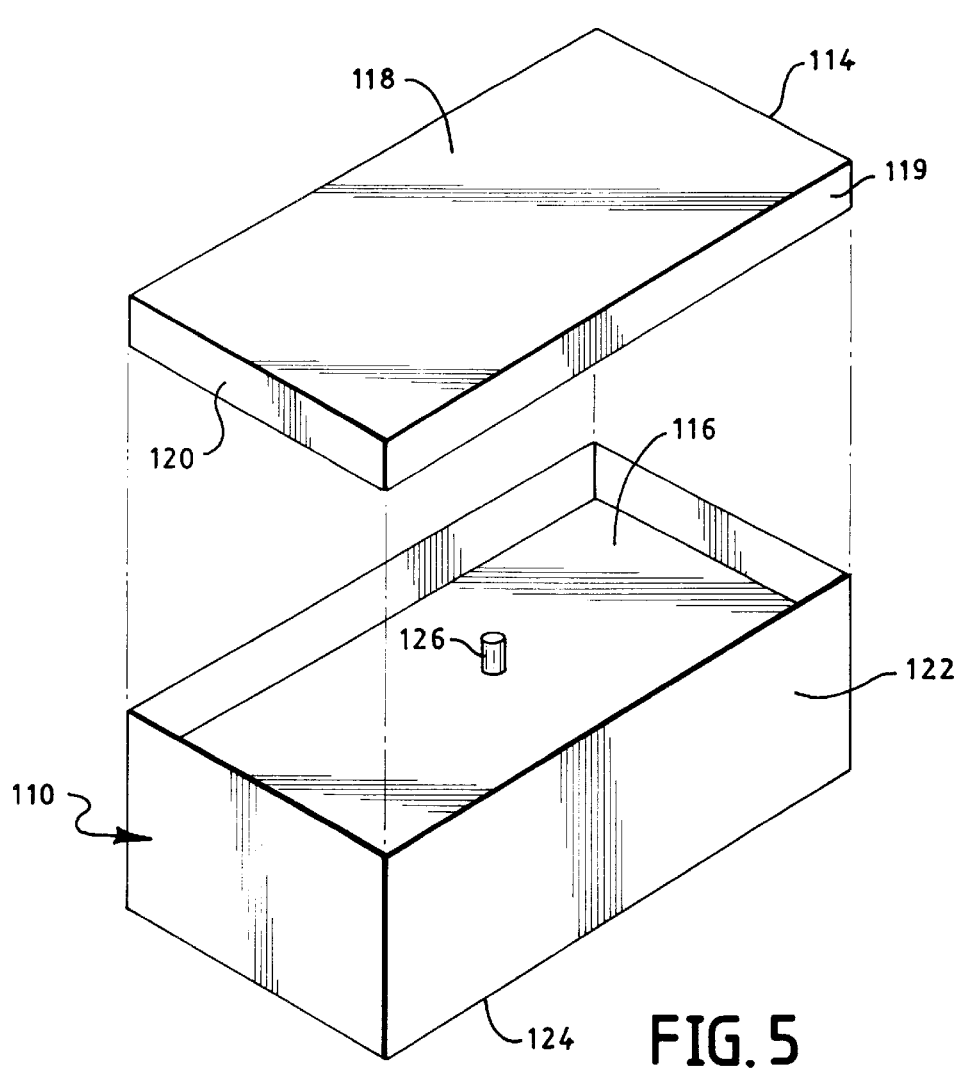
FIG. 5 is a perspective exploded view of a final assembly according to another embodiment of the invention.
Figure 6:
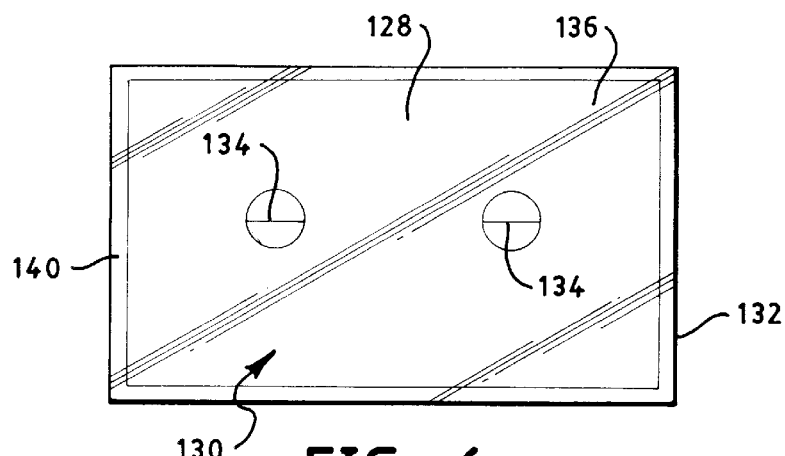
FIG. 6 is a top view of a shrink wrap subassembly including cassette tape audio medium and backer according to the embodiment of FIG. 5.
Figure 7:
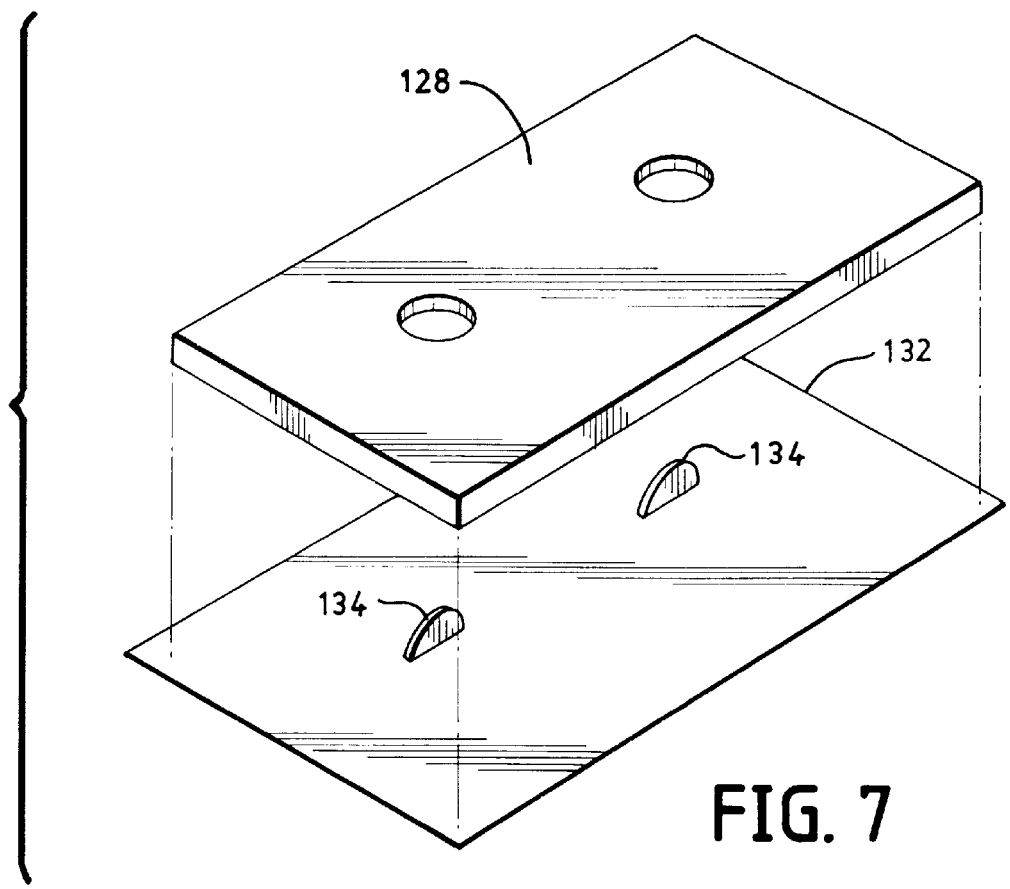
FIG. 7 is an exploded view showing the positioning of the cassette tape audio medium on the medium support according to the embodiment of FIG. 5.
Figure 8:
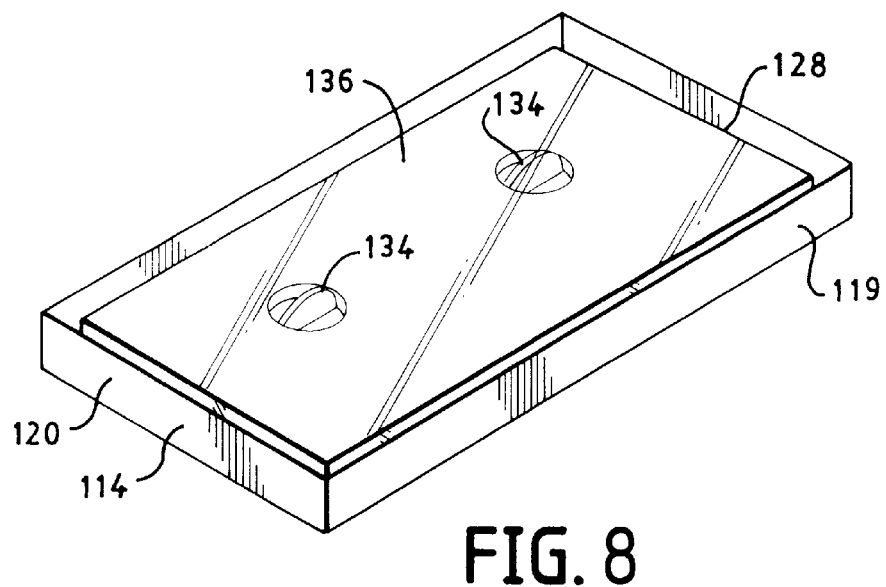
FIG. 8 is a perspective view showing a tin lid with positioned shrink wrap subassembly according to the embodiment of FIG. 5.

FIG. 5 shows a enclosure assembly generally designated 10. In the embodiment of FIG. 5 the enclosure assembly 110 includes a tin canister 112 and a tin lid 114. A candle 116 is disposed in the tin 112. The candle 116 may be loosely placed in the tin, e.g. with length and with a dimensions just smaller than the interior dimensions of tin canister 112. The candle 116 may also be formed within the tin canister 12. The lid 114 has a top 118 with a top outer surface and a top inner surface. The tin lid 114 also has a side 120 with a side outer surface and a side inner surface. In a similar manner the tin canister 112 has a side 122 with an outer surface and an inner surface (for example in contact with the candle 116 wherein the candle is formed within the tin canister 112) and a tin bottom 124. The candle of course has one or more wick 126.

A audio cassette 128 is provided which has an outer contour dimension which is length and width. This length and width is somewhat smaller than the inner length and width formed by the inner surface of side 120 of the tin lid 114.

According to the embodiment of FIG. 1, the audio cassette 128 is provided in a shrink wrap subassembly 130. The shrink wrap subassembly 130 includes a medium support 132 which is preferably a cardboard paper type backer. The backer 132 preferably also includes audio cassette center support elements 134.

The backer 132 may have a rectangular outer contour or some other shape. The backer 132 has at least one dimension (such as the width of the backer 132) which is slightly larger than the inner width defined by the inner surface of sides 20 of tin lid 14. The audio cassette 128 and backer 32 are placed together with the center support elements 134 passing through the holes of the audio cassette 128. The audio cassette 128 and the backer 132 are then shrink wrapped in plastic material 136 to form the shrink wrap subassembly 130.

As the center support elements 134 position the audio cassette 128 relative to the backer 132, there is a peripheral region 140 formed between the outer edge of backer 132 and audio cassette 128. If the backer 132 is not rectangularly shaped, the backer 132 should at least have two portions, each of which provide a peripheral region 140.

As shown in FIG. 4, the shrink wrap subassembly 130 is disposed within the interior of the tin lid 114. Because the outer contour of the medium support 132 has a greater dimension than the dimension defined by the inner surface of wall 120, the shrink wrap subassembly 130 is wedged into the interior of the tin lid 14. This provides a temporary holding of the audio cassette 128, particularly the entire shrink wrap subassembly 130 in the tin lid 114. This wedge fitting maintains the position of the audio cassette 128 (audio medium) relative to the candle 116 when the canister is closed to form the final assembly 110. The peripheral region 140 allows the wedging effect but also prevents any significant forces from being applied between the audio cassette 128 and the tin lid 14.

Figure 9:
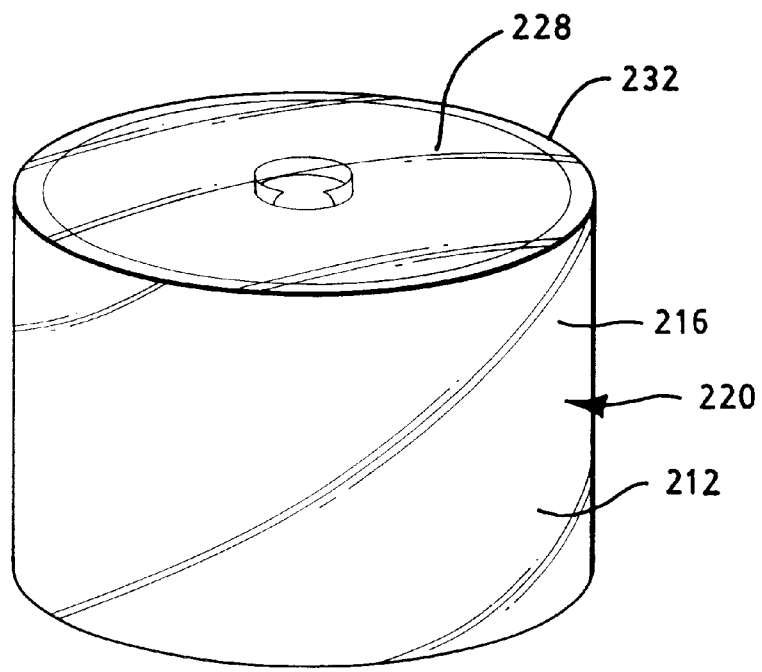
FIG. 9 is a perspective view showing a CD and candle final assembly with shrink wrap enclosure.

The embodiment of FIG. 9 provides an enclosure assembly 220 in the form of a shrink wrap or plastic wrap 212. A backer 232 is provided having about the same outer dimension as a candle 216. The compact disc 228 has about the same diameter as the candle 216 and the backer 232. The arrangement of FIG. 9 may also be provided without the backer 232. However, the backer provides the advantage of keeping the compact disc out of contact with the top of the candle 216 and the backer may also be provided on the opposite (or on both sides) of the compact disc 228 thereby providing some protection for the disc. Besides providing the enclosure 212 as a shrink wrap film, another type of wrap may also be used and the wrap 212 may be other than transparent (it can be colored or opaque).

Figure 10:
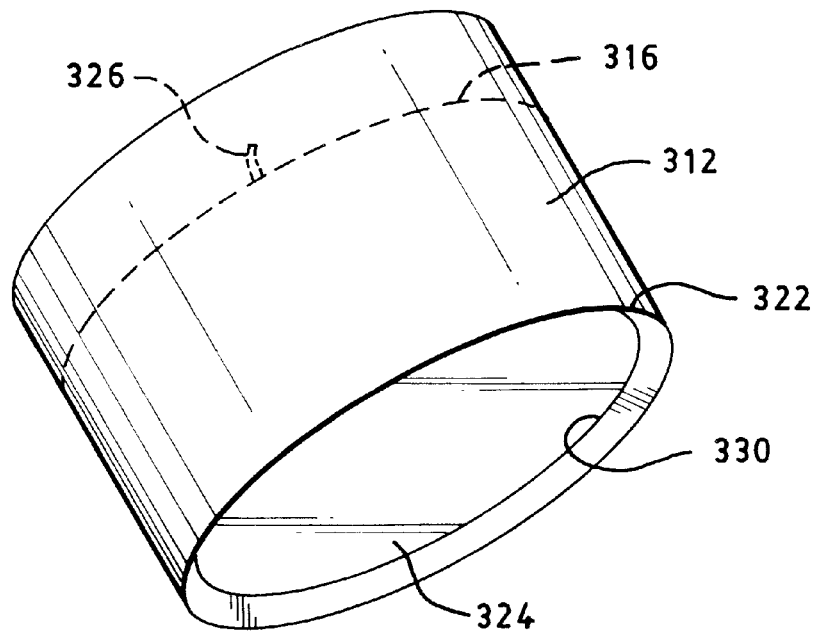
FIG. 10 is a bottom perspective view showing a candle with tin canister having recessed bottom for receiving a shrink wrap subassembly, according to still another embodiment of the invention.

FIG. 10 shows still another embodiment of the invention wherein a tin canister 322 is used for holding a candle 316 which is shown in phantom line. The candle 316 has a wick 326, also shown in phantom line. The canister 322 has a bottom 324. The bottom 324 is recessed slightly such that an interior surface of side 322 is provided near the bottom 324. This surface 340 is part of a lip structure of the canister 312. The inner surface 340 provides an interior dimension (inner surface diameter) which is just slightly smaller than the outer contour diameter of the backer 32. The shrink wrap assembly 30 as described with regard to FIG. 1 is positioned within the region defined by bottom 324 and surface 340 and is held based on a wedging of the backer 32 (in a manner similar to that described with regard to the embodiment of FIG. 1). This final assembly may then be enclosed via a shrink wrap enclosure to provide the final assembly with enclosure. However, the arrangement may also be sold or distributed without a enclosure assembly and a tin lid 14 may also be provided.

The main components of the process include providing an audio medium having a contour shape and providing a rigid or semi rigid container having a peripheral shape. The audio medium is positioned on a backer to form a sub assembly. The backer has an outer peripheral shape which is somewhat larger than an outer peripheral shape of the audio medium. The container has an enclosed surface peripheral shape which is somewhat smaller than the backer peripheral shape. The sub assembly is disposed in the enclosed surface peripheral shape of the container such that an edge of the backer which is radially outwardly of the audio medium is deformed and retains the sub assembly with respect to the container by establishing a frictional connection.

While specific embodiments of the invention have been shown and described in detail to illustrate the application of the principles of the invention, it will be understood that the invention may be embodied otherwise without departing from such principles.

What is claimed is:

1. An audio medium and candle arrangement, comprising:
    a candle having an outer contour and a first end and a second end;
    an audio medium having an outer contour which generally corresponds to said outer contour of said candle, said audio medium being positioned adjacent to said candle; and
    a candle enclosure maintaining a position of said audio medium relative to said candle.

2. An arrangement according to claim 1, wherein said enclosure is a tin including a tin canister with the candle disposed therein and a tin lid, said audio medium being positioned in said tin lid.

3. An arrangement according to claim 2, wherein said audio medium is a circular tin and said tin has a generally circular cylindrical shape.

4. An arrangement according to claim 2, further comprising an audio medium backer and a shrink wrap enclosure, said audio medium, said audio medium backer and said shrink wrap being provided as a shrink wrap subassembly.

5. An arrangement according to claim 1, wherein said enclosure is a tin including a tin canister with the candle disposed therein, said tin canister having a lower lip edge and a recessed bottom, the assembly further comprising an audio medium backer and a shrink wrap enclosure, said audio medium, said audio medium backer and said shrink wrap enclosure being provided as a shrink wrap subassembly wherein said backer is positioned against a bottom of said tin canister, and has an outer dimension which is slightly greater than an outer dimension of an interior of said canister lip.

6. An arrangement according to claim 2, wherein said tin lid includes a tin lid interior top surface and a tin lid interior side surface, the assembly further comprising an audio medium backer and a shrink wrap enclosure, said audio medium, said audio medium backer and said shrink wrap being provided as a shrink wrap subassembly wherein said backer is positioned against said interior top surface within said tin lid, said backer having an outer dimension which is slightly greater than an inner dimension of defined by said tin lid interior side surface.

7. An arrangement according to claim 2, wherein said audio medium is a tape cassette and said tin has a generally rectangular cylindrical shape.

8. An arrangement according to claim 2, wherein said audio medium is a compact disc and said tin has a generally circular cylindrical shape.

9. An audio medium and object container arrangement, comprising:

an audio medium having an outer contour; and an object container with an enclosed surface having an inner contour, said outer contour of said audio medium being smaller than said inner contour of said container;

an audio medium backer having an outer contour having a greatest dimension which is bigger than a greatest dimension of said audio medium outer contour and bigger than at least a dimension of said container inner contour, said audio medium being positioned adjacent to said backer to form a sub assemble, said sub assembly being disposed in the enclosed surface inner contour of the container such that an edge of the backer which is radially outwardly of the audio medium is deformed by said enclosed surface and to maintain the sub assembly with respect to the container by establishing a frictional connection.

10. An arrangement according to claim 9, wherein said container is a tin including a tin canister with the candle disposed therein and a tin lid, said audio medium being positioned in said tin lid.

11. An arrangement according to claim 10, wherein said audio medium is a circular tin and said tin has a generally circular cylindrical shape.

12. An arrangement according to claim 10, wherein said sub assembly includes said audio medium shrink wrapped with said backer, said audio medium, said audio medium backer and said shrink wrap being provided as a shrink wrap subassembly.

13. An arrangement according to claim 9, wherein said container is a tin including a tin canister said tin canister having a lower lip edge and a recessed bottom, said sub assembly further comprising shrink wrap film around said audio medium and said backer, said audio medium, said backer and said shrink wrap enclosure being provided as a shrink wrap subassembly wherein said backer is positioned against a bottom of said tin canister, said shrink wrap subassembly having an outer dimension which is slightly greater than said container inner contour dimension defined by an interior of said canister lip.

14. An arrangement according to claim 10, wherein said tin lid includes a tin lid interior top surface and a tin lid interior side surface, the assembly further comprising an audio medium backer and a shrink wrap enclosure, said audio medium, said audio medium backer and said shrink wrap being provided as a shrink wrap subassembly wherein said backer is positioned against said interior top surface within said tin lid, said backer having an outer dimension which is slightly greater than an inner dimension of defined by said tin lid interior side surface.

15. An arrangement according to claim 10, wherein said audio medium is a tape cassette and said tin has a generally rectangular cylindrical shape.

16. An arrangement according to claim 10, wherein said audio medium is a compact disc and said tin has a generally circular cylindrical shape.

17. A process comprising the steps of:

providing an audio medium having an outer peripheral shape providing a rigid or semi rigid container having a peripheral shape;

positioning the audio medium on a backer to form a sub assembly, the backer having an outer peripheral shape which is somewhat larger than an outer peripheral shape of said audio medium, the container having an enclosed surface peripheral shape which is somewhat smaller than the backer peripheral shape;

disposing said sub assembly in the enclosed surface peripheral shape of the container such that an edge of the backer which is radially outwardly of the audio medium is deformed and retains the sub assembly with respect to the container by establishing a frictional connection.

* * * * *